3,845,222
TEXTURIZING PROCESS FOR SINGLE CELL PROTEIN

Steven R. Tannenbaum, Framingham, Mass., assignor to Standard Oil Company, Chicago, Ill.
No Drawing. Continuation-in-part of abandoned application Ser. No. 32,387, Apr. 27, 1970. This application Mar. 1, 1972, Ser. No. 230,949
Int. Cl. A23j 3/00
U.S. Cl. 426—148          9 Claims

ABSTRACT OF THE DISCLOSURE

Protein-containing single-cell microorganisms are texturized by a process in which a paste of individual cells is heated under shearing agitation, extruded, and then passed through a conditioning zone capable of inducing the formation of a textured product suitable for use as an additive to or substitute for natural foods.

---

CROSS-REFERENCE TO RELATED APPLICATIONS

The application is a continuation-in-part of application Ser. No. 32,387, filed Apr. 27, 1970 and now abandoned.

BACKGROUND OF THE INVENTION

This invention relates generally to protein-containing single-cell microorganisms, and more specifically, to a texturization process for single-cell proteins including heating a paste of protein-containing cells while simultaneously subjecting the cells to a shearing force, extruding the paste and then cooling, drying, chemically treating or otherwise conditioning the extrudate to induce texture formation.

In recent years much attention has been directed toward the development of new sources of protein which can be incorporated in foods or food additives suitable for human consumption. Rapid increases in world population have made the continued dependence on traditional sources of protein highly impractical. Moreover, the supply of protein from typical sources of protein, such as animal meat and certain vegetables, is inadequate to provide balanced diets sufficient to satisfy the needs of humans throughout the world.

One possible solution to the problem of supplying the ever-increasing need for food protein is provided by processes for the bio-synthetic manufacture of protein through the growth of microorganisms on hydrocarbon or other substrates. It is known, for example, that microorganisms such as bacteria and yeast, which are grown by single-cell reproduction, contain high proportions of proteins and can be utilized directly in foods as a whole cell material or can be treated to recover protein isolate. Recently efforts have shown that micro-organisms, grown on hydrocarbon substrates, can be successfully used in animal feeds; but as yet these microorganisms have not been commercially accepted in food preparations suitable for human consumption.

With the development of successful processes for the synthetic production of protein-containing microorganisms (sometimes referred to herein as single cell proteins), an urgent need has developed for methods of texturizing such single-cell protein materials in a manner sufficient to render them suitable for use in food products. Generally, single-cell protein is initially produced as a wet paste and then is subsequently converted into dry powder form. This dry powder, similar in appearance and feel to flour, lacks the texture and food-like sensation to the mouth necessary to make an attractive food. Moreover, when placed in water, the powdered single cell protein rapidly reverts back to single-cell form.

Ideally, therefore, it is desirable to impart properties such as chewiness, crispness, resistance to dispersion in water and the like to such single-cell proteins in order that they may be used to full advantage as additives to and substitutes for natural foods. Although various techniques are known in the art for effecting texture formation in soybean based protein, such techniques are not always applicable to single-cell protein technology. For example, it is known that meat-like protein products can be made from protein-containing soybean meal by subjecting specific mixtures of the meal to heat, pressure and mechanical agitation in an extrusion device. Typically, however, controlled pH texturizing conditions and specific additives, such as sodium hydroxide, are required to cause texturization of the molecular size protein contained in the soybean meal. See, for example Atkinson United States Pat. No. 3,480,442, granted Nov. 25, 1969. In addition, texturization is so easily accomplished that it takes place in the extrusion zone itself rather than in a post treatment zone and, therefore, specific treatment after extrusion is typically unnecessary.

The living world is divided into three "kingdoms"—plant, animal and protist. The first two are multicellular and their development always involves extensive tissue differentiation. Protists are generally unicellular and lack tissue differentiation. Typical protists include yeasts and bacteria. Stated differently, protists represent the simplest level of biological organization while even the lower plants and animals represent vastly more complex biological organizations.

Unicellular protists such as yeasts and bacteria are extremely minute and contain desirable protein enclosed within a cell-wall structure comprising essentially carbohydrate materials. The amino acids comprising the protein of unicellular protists are substantially those involved in the larger protein-containing aggregates of plant or animal origin so that little difference in nutritional value is found.

The cell-wall structure may be viewed as a tough, large bag fashioned from highly cross-linked polysaccharides. Consequently the protein moiety of each cell is shield from that of every other cell. Hence, the inter-molecular bonding forces which are though to readily effect texturization of protein found within multi-cellular plant or animal structures cannot be utilized unless some means be found for freeing some portion of protein from within the cell structure. This distinctive structure of unicellular protists has heretofore severely limited the utility of yeasts and bacteria in food products because of inability to effect a suitable and stable degree of texturization.

SUMMARY OF THE INVENTION

According to this invention, there is provided a process for treating single-cell protein in a manner sufficient to impart desirable textural properties to the cell material. More specifically, a paste comprising single-cell protein and water, together with other ingredients if desired, is heat treated for a period between about 10 to 300 seconds at a temperature of from about 150° F. to 400° F. While the individual cells are being heat treated, they are simultaneously subjected to a shearing force corresponding to a shear rate in the range of about 10 r.p.m. to 60 r.p.m. and a torque of 200 to 2,000 meter-grams by means of an extruder or other shearing device such as a roller mixer, and cam blade mixers. The plurality of cells are then extruded into a conditioning zone favorable to the formation of a textured single-cell protein product.

The texturized products formed by the process of this invention have the highly desirable properties of chewiness, crunchiness, cripness, and resistance to dispersion in water. This latter characteristic is particularly meaningful, since the major drawback of single cell protein materials, namely, the reversion back into the single cells when placed in water, has been entirely eliminated by the texturization process of this invention.

By practicing the process of this invention, therefore, one can prepare a single-cell protein product having the requisite physical properties for use as an additive to or substitute for natural foods. Moreover, texturization is accomplished for previously un-texturizable materials with a minimum of complex and extensive equipment, and without the necessity for close pH control and specific additives.

DESCRIPTION OF THE PREFERRED EMBODIMENTS

The process of this invention is especially designed to provide a method for imparting texture characteristics and properties to protein-containing unicellular microorganisms grown by known commercial fermentation processes. In one embodiment of this invention, the cell harvest from a commercial fermentor, as for example the crude, moisture-containing product cake recovered from a centrifuge or filter, serves as the starting material for the texturization process.

Any living microbial cell materials can be treated according to the texturization process of this invention. In a fully integrated, continuous system, the microbial cells are conveniently grown in a first fermenting stage where oxygen and a suitable substrate, such as liquid or gaseous hydrocarbons or carbohydrates, together with a nutrient solution containing vitamins and minerals are fed to a stirred reactor containing the microorganisms. The growth rate of microorganisms on the hydrocarbon or other substrate is typically exponential in nature. As the microorganism concentration increases, a portion of the reaction mixture is withdrawn from the stirred reactor and the microorganisms are separated from the withdrawn reaction mixture.

By way of illustration, bacteria such as those listed in Table I and yeasts such as those listed in Table II are suitable microorganisms for use as starting materials in the practice of this invention.

TABLE I—SUITABLE BACTERIA

*Acetobacter sp.*
*Arthrobacter sp.*
*Bacillus subtilus*
*Corynebacteria sp.*
*Micrococcus sp.*
*Pseudomonas sp.*

TABLE II—SUITABLE YEASTS

*Candida curvata*
*Candida lipolytica*
*Candida pulcherima*
*Candida utilis*
*Hansenula anomala*
*Oidium lactis*
*Saccharomyces carlsbergensis*
*Saccharomyces cerevisiae*
*Saccharomyces fragilis*
*Trichosporon cutaneum*

The use of *Candida utilis, Saccharomyces cerevisiae, Saccharomyces fragilis,* and *Saccharomyces carlsbergensis* are preferred starting materials for the texturization process of this invention, however, because each is considered by the F.D.A. to be suitable for use in food products.

In general, the texturization process comprises heating and simultaneously shearing an aqueous paste of single cell protein and then extruding the paste into a conditioning zone from which a textured product can be recovered. The aqueous paste of single cell protein preferably contains about 20 weight percent water, although a water content of 10 to 50 weight percent is suitable. When the single cells to be texturized come directly from a fermentation harvesting step, it is often desirable to adjust the water content by means such as centrifuging, drying stirring with water addition, and the like, to obtain a suitable paste material.

In additional to microbial cells and water, the paste can also contain additives, such as salts, oils, fats, emulsifiers, flavoring, and coloring agents, and the like which enhance the properties of the final product.

A cell paste of suitable moisture content is first simultaneously heat treated and subjected to a shearing force, typically by means of a screw extruder. Acceptable temperatures for the heat treatment step can vary between about 150 and 400° F. with the preferred maximum temperature being generally about 225 to 275° F. The exact maximum temperature employed in a particular situation will depend, of course, on the nature of the particular cells and additives which make up the paste. Heat treatment for about 30 seconds is generally of sufficient duration, although depending on the characteristics of the particular paste, the treatment can extend for as little as 10 seconds or as long as 5 minutes.

At the same time that the cell paste is being heat treated, it is subjected to a shearing force which corresponds preferably to a shear rate on the order of 10 r.p.m. to 60 r.p.m. and a torque on the order of 200 to 2,000 meter-grams In a preferred embodiment of my invention, the cell paste is subjected to the heat treatment and shearing force by processing in a steam-heated screw extruder, although equivalent means of achieving the same result are likewise suitable to accomplish texturization of the single cell protein. It should be understood, however, that other methods of applying a shearing force, such as roller mixing and cam and blade mixing, are also suitable in the practice of this invention.

After the application of shear and heat treatment, the cell paste is extruded through a die, appropriately shaped to correspond to the desired shape of the final product and then passed into a conditioning zone in which the formation of a textured single cell protein product takes place. The conditioning process is not well understood but most likely involves some chemical transformation. Examples of suitable conditioning zones are cooling zones, in which protein product is subjected to temperatures ranging from 80° to 212° F. for 30 seconds to 6 minutes, drying zones in which the protein product is exposed to a dry air stream at temperatures of 100° to 150° F. for 2 to 10 minutes, oxygenation zones in which the protein product is exposed to an oxygen stream at 90° to 150° F. for 30 seconds to 3 minutes, and chemical treatment zones such as alkaline or acid baths and the like. In many instances, conditioning of the extruded material in an air stream is sufficient to induce texture formation. Typically, the extrudate is cooled by exposure to the air stream at ambient temperatures and incidentally is also partially dehydrated, thus acquiring the desirable characteristic of retainable texture.

For some single cell protein materials, however, cooling in an air stream alone is insufficient to induce texture formation. Consequently, various other conditioning techniques, such as drying, are sometimes required to induce suitable texture formation after the single-cell protein extrudate has been passed through a cooling zone.

The textured extrudate may be further treated if desired, such as by bleaching, cooking, deep-fat frying, and the like, to prepare an appetizing food product. It should be recognized, however, that the texturized single-cell protein can be used as is or, after physical alteration, such as grinding or cutting, can be used as an additive in prepared food products.

The shearing force applied during heat treatment is a necessary step for the bond activation or such other phenomena which give rise to the development of texture in the products obtained by the process. This fact is even further illustrated by the marked improvement of textural properties in a cellular product obtained from a paste treated in the process of this invention over the product obtained through simple heating and drying of a similar paste.

The texturization process of this invention and the textured products obtained therefrom are more fully illustrated in the following examples.

EXAMPLE I 100 grams of spray dried Torula yeast was mixed with 106 ml. of distilled water to form a uniform paste. The paste was extruded with a C. W. Brabender Model 200 extruder having a die and channel temperature of 300° F. A uniform tapered screw with 2:1 compression ratio was used in the extruder. Rotation speed of the screw was 50 r.p.m., and the torque buildup was under 100 meter-grams. The L/P ratio in the extruder was 20/1. A rod die of 1/16 inch I.D. and L/D of 3/1 was used in the extruder. After the paste was subjected to simultaneous heating and shearing in the extruder, the product obtained therefrom was light brown in color and was thread-like in shape. A slight stretching of the product was accomplished before it was permitted to cool.

Then the cooled thread of material was dried in an oven maintained at 150° C. During drying, the thread-like material became darker in color and attained a crisp texture.

Upon immersion in water, the textured single cell protein product did not disperse and thus was stable against reversion into single, individual cell form.

EXAMPLE II 50 grams of spray dried Torula yeast was mixed with 50 grams of isolated soybean protein and 100 ml. of distilled water to form a uniform paste. The paste was extruded at 212° F. in the same extruder employed in Example I. The product was white in color and smooth in texture. When dipped in water, some dispersion of yeast took place. However, when the extrudate was dried in an oven at 390° F., the product was no longer water dispersible.

EXAMPLE III 75 grams of spray dried Torula yeast was mixed with 25 grams of all purpose wheat flour, 3 grams of salts and 88 ml. of water to form a uniform paste. This paste was then extruded in the C. W. Brabender extruder employed in Example I with the die and channel temperature maintained at 260° F. The single-cell protein extrudate was tan in color and had a smooth texture. When placed in water, some dispersion took place; but after heating for 5 minutes at 390° F. in an oven, the single cell protein product became slightly darker in color and non-dispersible in water. In addition, the oven-dried sample was crisp in texture, had a biscuit odor, and was suitable for use as a food substitute or additive.

I claim:

1. A process for imparting texture to microbial cells comprising the steps of:
   (a) heating an aqueous paste of microbial cell material to a temperature within the range from about 150° to about 400° F. for a time period within the range from about 10 to about 300 seconds, said paste containing from about 10 to about 50 wt. percent water;
   (b) simultaneously applying a shearing force to said cell paste, the shearing force corresponding to a shear rate of about 10 to about 60 r.p.m. and a torque of about 200 to about 2,000 meter-grams;
   (c) extruding the heated and sheared cell paste through a die to provide a shaped extrudate; and
   (d) exposing shaped extrudate to an oxygen-containing gas stream to produce a product which is chewy, crunchy, crispy and resists dispersion in water.

2. The process of claim 1 wherein the extruded paste is exposed to an air stream, said air stream being at a temperature within the range from about 80° to 212° F., for a time period of from about 0.5 to 6 minutes.

3. The process of claim 1 wherein the extruded paste is exposed to a dry air stream, said dry air stream being at a temperature within the range from about 100° to 150° F., for a time period of from about 2 to 10 minutes.

4. The process of claim 1 wherein the extruded paste is exposed to an oxygen stream being at a temperature within the range from about 90° to 150° F., for a time period of from about 0.5 to 3 minutes.

5. The process of Claim 1 wherein the microbial cells are selected from the group consisting of *Candida utilis, Saccharomyces carlsbergensis, Saccharomyces cerevisiae,* and *Saccharomyces fragilis.*

6. The texturized protein-containing single-cell microorganism product prepared by the process of claim 1.

7. A process for imparting texture to microbial cells comprising the steps of:
   (a) forming an aqueous paste of microbial cell material, said cell paste containing about 20 wt. percent water;
   (b) heating the cell paste in a steam-heated screw extruder within the range of 225° to 275° F. for about 30 seconds, while applying a shearing force corresponding to a shear rate of about 10 to 60 r.p.m. and a torque of about 200 to 2,000 meter-grams;
   (c) extruding the heated and sheared paste through a die;
   (d) cooling the shaped extrudate by exposure to an oxygen-containing gas stream at ambient temperature; and
   (e) drying the cooled, shaped extrudate by exposure to a dry air stream maintained at a temperature within the range from 100° to 150° F. to produce a product which is chewy, crunchy, crispy and resists dispersion in water.

8. The process of claim 7 wherein the oxygen-containing gas stream is air.

9. The process of claim 7 wherein the protein-containing single cell microorganisms are selected from the group consisting of *Candida utilis, Saccharomyces carlsbergensis, Saccharomyces cerevisiae,* and *Saccharomyces fragilis.*

References Cited
UNITED STATES PATENTS

| | | | |
|---|---|---|---|
| 3,480,442 | 11/1969 | Atkinson | 99—17 |
| 3,488,770 | 1/1970 | Atkinson | 99—17 |
| 3,692,531 | 9/1972 | Heusdens et al. | 99—17 |
| 3,662,672 | 5/1972 | Hoer | 99—17 |
| 3,662,671 | 5/1972 | Frederiksen et al. | 99—17 |

OTHER REFERENCES

Altschus, Aaron, Processed Plant Protein Foodstuffs, Academic Press, New York, 1958, pp. 789–804.

JAMES R. HOFFMAN, Primary Examiner

U.S. Cl. X.R.

426—104, 276, 364

PO-1050
(5/69)

UNITED STATES PATENT OFFICE
CERTIFICATE OF CORRECTION

Patent No. 3,845,222      Dated October 29, 1974

Inventor(s) Steven R. Tannenbaum

It is certified that error appears in the above-identified patent and that said Letters Patent are hereby corrected as shown below:

Column 2, line 41, "shield" should be -- shielded --;
         line 43, "though" should be -- thought --.

Column 3, line 9, "extensive" should be -- expensive --.

Column 4, line 2, "drying" should be -- drying, --;
         line 26, "meter-grams" should be -- meter-grams. --.

Column 6, line 3, "exposing shaped" should be -- exposing the shaped --;
         line 15, After "stream" insert -- , said oxygen stream --.

Signed and sealed this 11th day of March 1975.

(SEAL)
Attest:

RUTH C. MASON
Attesting Officer

C. MARSHALL DANN
Commissioner of Patents
and Trademarks